June 18, 1968 W. LORAN 3,388,473
DEPTH CONTROL AND DIRECTION INDICATING DEVICE
FOR ENDODONTIC OPERATIONS
Filed Sept. 20, 1965
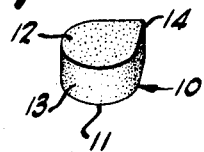
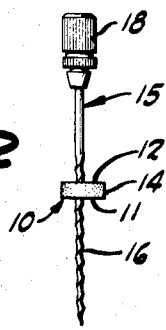
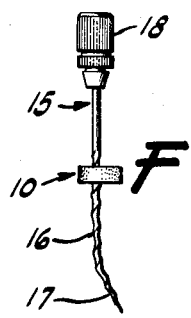
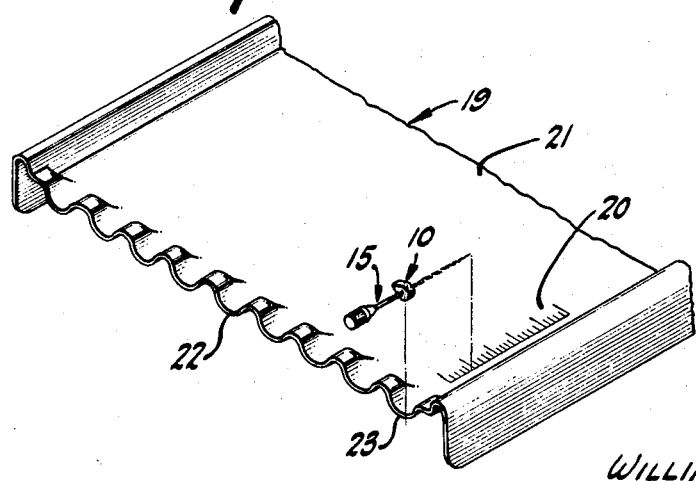
INVENTOR.
WILLIAM LORAN
BY
Stanley Bialos
ATTORNEY

United States Patent Office 3,388,473
Patented June 18, 1968

3,388,473
DEPTH CONTROL AND DIRECTION INDICATING DEVICE FOR ENDODONTIC OPERATIONS
William Loran, 112 Janes St., Mill Valley, Calif. 94941
Filed Sept. 20, 1965, Ser. No. 488,706
6 Claims. (Cl. 32—57)

ABSTRACT OF THE DISCLOSURE

A depth control and direction indicating device for an endodontic instrument to control the depth of penetration thereof into a dental or pulpal canal and to indicate any angular displacement imparted to such instrument during its penetration. The device constitutes a thin wafer of resilient material penetrated by the instrument and frictionally gripping the same so as to maintain itself in any position of adjustment therealong. The undersurface of such wafer constitutes a stop limiting the depth of penetration of the instrument, and the wafer has a perimetric contour forming an indicator pointer at one location therealong to serve as an index of any angular displacement imparted to the instrument.

---

This invention relates to a control and indicating device for endodontic operations and, more particularly, to a depth control and direction indicating device adjustably mountable upon an endodontic instrument to control the depth of penetration thereof into the dental or pulpal canals.

In many endodontic operations it is necessary to insert a thin elongated instrument into the pulpal canals. Ordinarily, such instruments need to be repetitively inserted into and withdrawn from such canals, and controlling the depth of penetration during each insertion has always created a problem. Additionally, it is infrequent that such canals are perfectly straight and, consequently, at least many of the elongated instruments are formed of a malleable metal or other material so that they can be deformed or curved slightly by the dentist to enable them to follow the contour of the canal into which they may be inserted. Thus, since the instrument may be angled or curved, not only must the dentist be concerned with the depth of penetration thereof, but he also must precisely position the instrument in an angular sense during each insertion so that the curvature thereof will conform to the curvature of the canal into which it is inserted. Such precise positioning of the instrument may require that it be rotated slightly or angularly displaced about its longitudinal axis as it is inserted.

For the most part, each dentist has developed his own schemes and techniques for determining and repeating the depth of penetration of an instrument into a dental or pulpal canal and for locating any angular distortion imparted to the instrument. Such systems and techniques are largely expedients, and as such have not been versatile and have not provided the degree of accuracy that is desirable in endodontic operations where the dimensions involved are quite restricted. That is to say, the depth of penetration of an instrument is generally measured in terms of a few millimeters (e.g., 20–30), the diameter of pulpal canals is such that the instrument sizes are usually less than a millimeter (e.g., $\frac{1}{10}$–$\frac{1}{100}$ mm.), and these rather small instruments must be manipulated by the dentist within the limited confines of a patient's mouth. Additionally, it is usually necessary to adjust the depth of penetration one or more times during an operating procedure, and the generally used techniques are not susceptible of quick and easy, ready change especially under aseptic conditions.

In view of the foregoing, objects of the present invention, among others, are: to provide an improved depth control device for use with endodontic instruments to control the depth of penetration thereof; to provide an improved depth control device which also supplies an indicia of the direction of any angular deformation of the instrument applied thereto so that it can conform generally to the configuration of the canal receiving the same, and which also supplies indicia concerning any angular turn or displacement that the dentist may give to the instrument; and to provide a depth control and angle indicating device of the type described that can be rapidly adjusted with one hand and sterility maintained during such adjustment, that automatically stays in the position of adjustment thereof, that can be used with most endodontic instruments, that is useful to label or identify the various canals in multiple-rooted teeth, and that is resistant to heat so that it may be heat sterilized without damage thereto.

An embodiment of the invention is illustrated in the accompanying drawing in which:

FIGURE 1 is a perspective view of a device embodying the invention;

FIGURE 2 is a side view in elevation illustrating the device in adjusted position upon an endodontic instrument;

FIGURE 3 is a side view in elevation similar to that of FIGURE 2, but showing the instrument after it has been deformed to provide a curvature therealong corresponding to that of a root canal;

FIGURE 4 is a broken perspective view showing a device-equipped instrument in association with a depth gauge formed along an instrument tray.

Illustrated in FIGURE 1 is a depth control and direction indicating device embodying the invention and which is designated in its entirety with the numeral 10. The device 10 has a lower or undersurface 11 and a top or upper surface 12, and such surfaces are disposed in substantially parallel relation. The device 10 has a generally cylindrical perimetric surface 13 which, at one location therealong is elongated radially to define an indicator 14 in the general form of a point or pointer.

Thus, the device 10 is essentially a relatively thin wafer and it is adapted to be penetrated by an elongated dental instrument which then extends therethrough. The device is also resilient so as to frictionally grip a dental instrument inserted therethrough and thereby maintain itself in any position of adjustment along such instrument. However, the coefficient of friction is sufficiently low that the device can be displaced axially along such instrument with relative ease in a manner to be described hereinafter.

In use, the undersurface 11 of the device is adapted to abut, as the case may be, the incisal and occlusal plane of a tooth and, accordingly, such abutment therebetween defines the maximum desired extent of penetration of a dental instrument into a canal. Thus, the device 10 should be sufficiently large to enable the position thereof to be clearly evident to a dentist performing an endodontic operation, but at the same time, the device must be small enough that it does not block or obscure the vision or otherwise significantly interfere with the operating procedure.

With respect to all of the foregoing factors, a device 10 having a thickness between the surfaces 11 and 12 of approximately $\frac{1}{16}$ of an inch and a diameter of about $\frac{1}{8}$ of an inch, exclusive of the point 14, has been found to be satisfactory. Further, a rather soft silicone rubber (e.g., a hardness of approximately 50 durometer) provides excellent results and affords the requisite frictional resistance to maintain any position of adjustment of the device along the dental instrument; and at the same time, permits ready penetration thereof by such instrument without first being perforated to provide an aperture or passage therethrough. Additionally, this material is not adversely affected by the temperatures encountered in an autoclave or other heat sterilizer. It will be appreciated, however, that other materials might be used which provide the requisite freedom of penetration, coefficient of friction, and insensitivity to sterilizing temperatures.

Referring to FIGURE 2, the device 10 is shown in association with a dental instrument 15 which is intended to be illustrative of various instruments that may be used in endodontic operations such as root canal files, reamers, broaches, needles, spreaders, pluggers, etc. The particular instrument shown has an elongated shank 16 adapted to be inserted into a canal. The shank 16 is relatively malleable so that it may be turned or curved slightly, as shown at 17 in FIGURE 3, to cause the same to conform to the configuration of a canal into which it is inserted. Depending upon the particular dental instrument, the shank thereof may have a diameter in the approximate range of 0.1 of a millimeter to 0.01 of a millimeter. At its upper end, the instrument 15 has a head 18 which is adapted to be gripped by the fingers and may be knurled or otherwise roughened to facilitate manual manipulation thereof.

The indicator or point 14 of the device serves several functions. First, it is useful in indicating the direction of turn or curvature of the end portion 17 of the instrument; and in this connection, usually will be oriented to project in the same direction as such curve. Second, it may be necessary during an operating procedure for the dentist to rotate the instrument 15 slightly (usually such turn is less than 90°) and the point 14 can be observed to provide a visual indication of the angular extent of any rotation being enforced upon the instrument by the dentist. Third, a single tooth structure may have a plurality of canals, each of which is required to have a dental instrument inserted thereinto. In such cases, each instrument may be equipped with a device 10, and each such device and the point 14 thereof used to distinguish the various instruments and the canals and directions thereof, one from the others.

In FIGURE 4, a dental instrument 15 equipped with the depth control and direction indicating device 10 is illustrated in association with a measuring structure generally denoted 19. The structure 19 is provided with a scale 20 along a generally planar surface 21, and such surface 21 terminates at one end thereof in a transverse edge 22 that defines a stop 23 therealong disposed in substantial alignment with the scale 20. The particular structure 19 shown is an instrument tray section, and the function and purpose thereof are disclosed in my copending patent application, Ser. No. 381,062, filed July 8, 1964. The scale 20 in the specific embodiment shown is calibrated in millimeters with each division therealong being equivalent to one-half millimeter.

The division marks are actual distance measurements taken from the stop 23 and by way of example, the first division mark along the scale, in a typical embodiment, may be 20 millimeters from the stop 23. Accordingly, when the depth control device 10 is adjustably positioned along the shank 16, the measurement between the tip of such shank and the underlying surface 11 of the device 10 may be made from the stop 23 to the appropriate mark or division along the scale 20.

In use of the depth control and direction indicating device 10, an instrument 15 may be arranged therewith by simply pressing the tip of the shank 16 of such instrument through the device from the upper surface 12 to the undersurface 11 thereof. Depending upon the material and thickness thereof, the device need not first be perforated to permit such penetration, and the assembly of the device and instrument may be accomplished either before or after sterilization. If, however, the assembly is consummated following sterilization, it will evidently be advantageous to grip the device 10 with a sterile implement to maintain both the instrument and device in an aseptic condition for the commencement of an endodontic operation.

The resilient grip defined against the shank 16 by the circumjacent device 19 through which it extends is of sufficient magnitude to positively maintain the position of the device relative to the shank and prevent inadvertent movement therebetween. However, the frictional resistance to movement is not so great that the device 10 is constrained against displacements intentionally imparted thereto relative to the shank 16. In this respect, the position of the device is readily adjusted along the shank by simply locating the undersurface 11 against the stop 23 with the shank 16 of the instrument extending along the surface 21 in substantial juxtaposition with the scale 20. In this relative position of the components, manual force applied in an axial direction (generally toward the right as viewed in FIGURE 4) along the shank 16 will cause the instrument to be displaced relative to the device 10 which is constrained against axial displacement in the same direction as a consequence of its abutment with the stop 23. Such adjustable positioning of the device 10 can be accomplished in a one-hand manipulation by the dentist, and the extent of the adjustment is simply determined by reading the position of the tip of the shank 16 along the scale 20. Such adjustment is effected without contamination, provided that the measuring structure 19 is sterile.

While in the foregoing specification an embodiment of the invention is described in considerable detail for purposes of making a complete disclosure thereof, it will be apparent to those skilled in the art that numerous changes may be made in such details without departing from the principles and spirit of the invention.

I claim:

1. The combination with an elongated dental instrument adapted for use in an endodontic operation in which the instrument is inserted into a canal, of a depth control and direction indicating device circumjacent a portion of said instrument and defining a depth control effective to establish the extent of penetration of such canal by said instrument and defining also a direction indicator effective to index the direction of any angular deformation of said instrument imparted thereto which tends to cause it to conform to the angular configuration of such canal and to index also any angular displacement imparted to said instrument, said depth control and direction indicating device comprising a relatively thin wafer penetrated by said instrument which then extends therethrough, said wafer having a surface defining a stop adapted to abut tooth surfaces or the like and being provided with an indicator denoting its angular disposition, said wafer further being substantially resistive to sterilizing temperatures so that the structural characteristics thereof are not materially altered by subjection of said wafer to such temperatures.

2. The combination of claim 1 in which said indicator is formed integrally with said wafer and is defined by the perimetric contour thereof.

3. The combination with an elongated dental instrument adapted for use in an endodontic operation in which the instrument is inserted into a canal, of an adjustable depth control and direction indicating device circumjacent a portion of said instrument and defining a depth control effective to establish the extent of penetration of such canal by said instrument and defining also a direction indicator effective to index the direction of any angular deformation of said instrument imparted thereto which tends to cause it to conform to the angular configuration of such canal and to index also any angular displacement imparted to said instrument, said depth control and direction indicating device comprising a relatively thin wafer penetrated by said instrument which then extends therethrough and being resilient so that it frictionally grips such penetrated instrument and thereby maintains itself in any position of adjustment therealong, said wafer having a generally planar undersurface defining a stop adapted to abut tooth surfaces or the like and being provided with an indicator denoting its angular disposition, said wafer further being substantially resistive to sterilizing temperatures so that the structural characteristics thereof are not materially altered by subjection of said wafer to such temperatures.

4. The combination of claim 3 in which said wafer constitutes a silicone rubber material and is initially imperforate.

5. The combination of claim 3 in which said indicator is formed integrally with said wafer and is defined by the perimetric contour thereof.

6. The combination of claim 3 in which said wafer has an upper surface oriented in substantially parallel relation with the aforesaid undersurface thereof, and in which the perimetric edge of said wafer is generally cylindrical throughout a substantial portion thereof and merges therealong into a point, said point defining the aforesaid indicator.

References Cited
UNITED STATES PATENTS

| | | | |
|---|---|---|---|
| 1,907,923 | 5/1933 | Willis | 32—40 |
| 3,295,208 | 1/1967 | Redtenbacher | 32—40 |

OTHER REFERENCES

Time, Jan. 1, 1965, vol. 85, No. 1, pp. 54–55.

Dental Digest, October 1963, vol. 69, No. 10, p. 463.

LOUIS G. MANCENE, *Primary Examiner.*

ROBERT E. MORGAN, *Examiner.*